United States Patent [19]

Lew et al.

[11] Patent Number: 4,702,457
[45] Date of Patent: Oct. 27, 1987

[54] BALL PLUG VALVE

[76] Inventors: Hyok S. Lew; Yon S. Lew, both of 7890 Oak St., Arvada, Colo. 80005

[21] Appl. No.: 372,462

[22] Filed: Apr. 28, 1982

Related U.S. Application Data

[63] Continuation-in-part of Ser. No. 348,878, Feb. 16, 1982, abandoned.

[51] Int. Cl.⁴ .............................................. F16K 25/00
[52] U.S. Cl. ..................................... 251/161; 251/309
[58] Field of Search ............... 251/159, 170, 172, 161, 251/309

[56]  References Cited

U.S. PATENT DOCUMENTS

| | | | |
|---|---|---|---|
| 2,707,613 | 5/1955 | Wheatley | 251/162 |
| 3,275,025 | 9/1966 | Kowalski | 251/315 |
| 3,653,631 | 4/1972 | Hurst | 251/159 |

FOREIGN PATENT DOCUMENTS 588396  5/1947  United Kingdom ................ 251/309

Primary Examiner—Martin P. Schwadron

[57]  ABSTRACT

This invention relates to the ball plug valves comprising a ball plug of a cylindrical geometry with a hemispherical end rotatably engaging a matching cylindrical cavity with a closed hemispherical end formed within the valve body in a close tolerance wherein a hole bored through said ball plug in an oblique angle with respect to the central axis of said ball plug lines up with the fluid passage hole included in said valve body when said ball plug is rotated to the "open" position, while said hole through said ball plug takes a position substantially perpendicular to said fluid passage hole included in said valve body when said ball plug is rotated to the "closed" position, at which position said ball plug blocking the fluid passage hole shuts off the fluid flow. Various sealing means of annular geometry are disposed intermediate two mating hemispherical surfaces respectively belonging to said ball plug and said matching cavity in the valve body as the illustrative embodiments teaching how to improve the shut-off characteristics of the ball plug valves wherein the annular seals of variable seating pressure controlled by an internal or external means are included. The annular seals of variable seating pressure are also used in the construction of the ball valves applicable to the high pressure or high temperature process. The ball plug valves employing the combination of the "plug in the ball plug" for the throttling purpose under extreme pressure are also disclosed.

13 Claims, 35 Drawing Figures

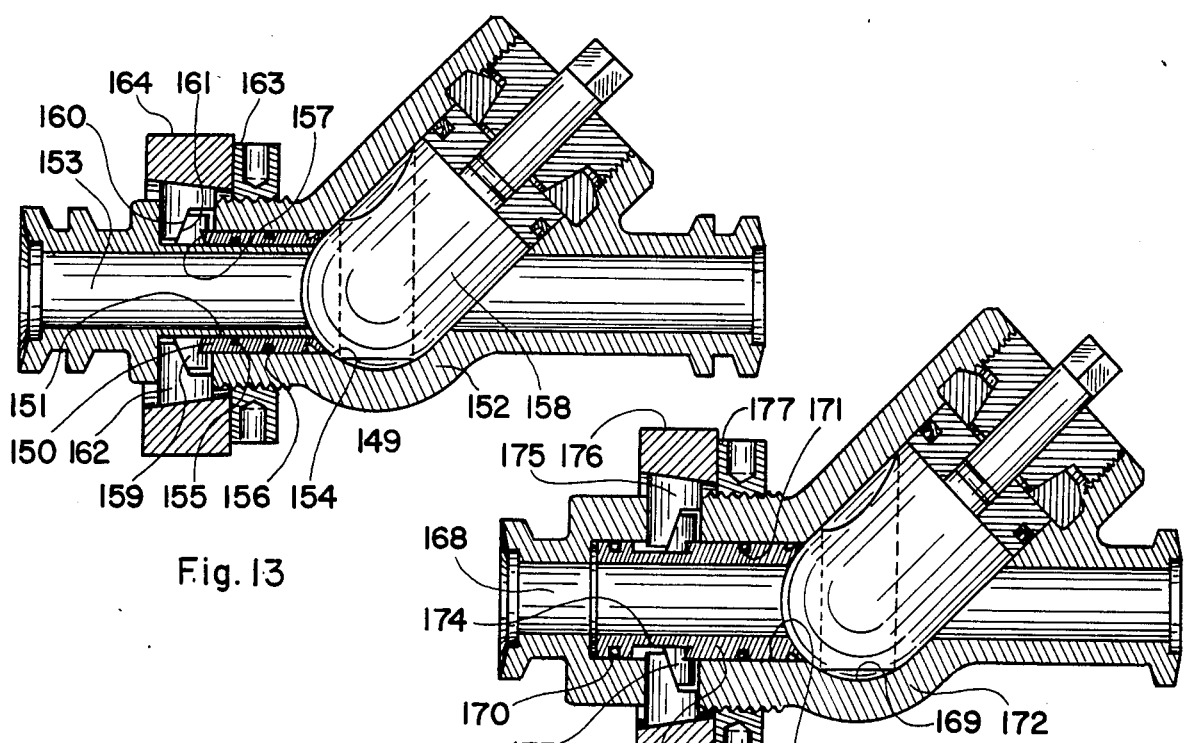
Fig. 13
Fig. 14
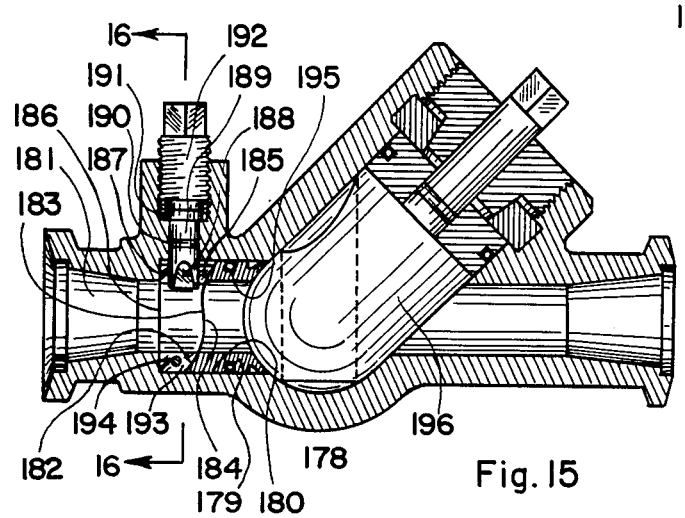
Fig. 15
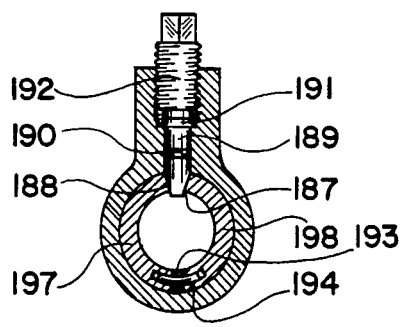
Fig. 16
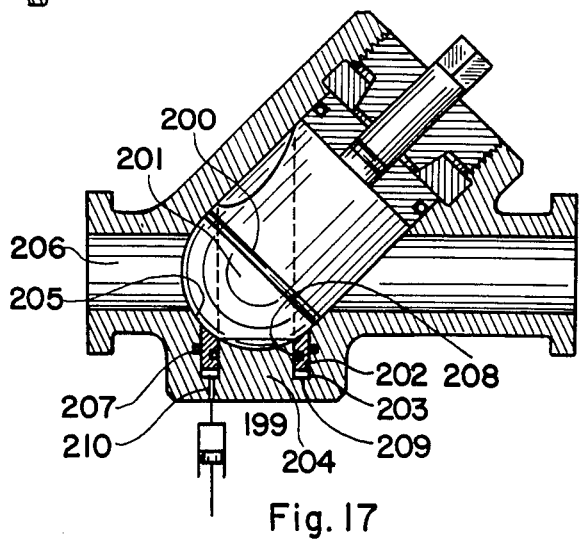
Fig. 17

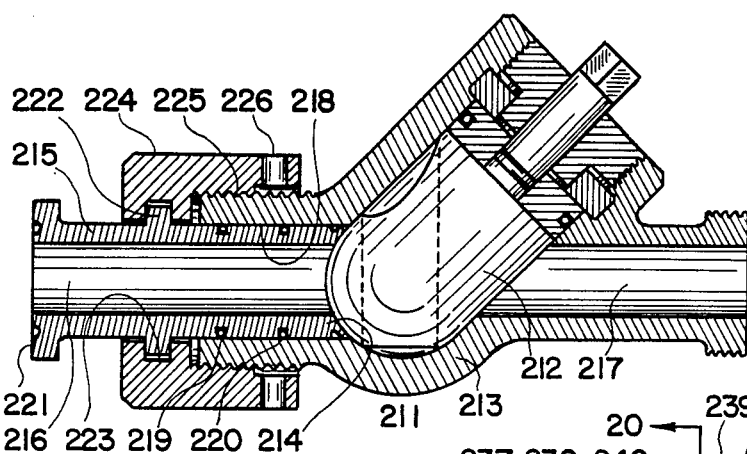
Fig. 18
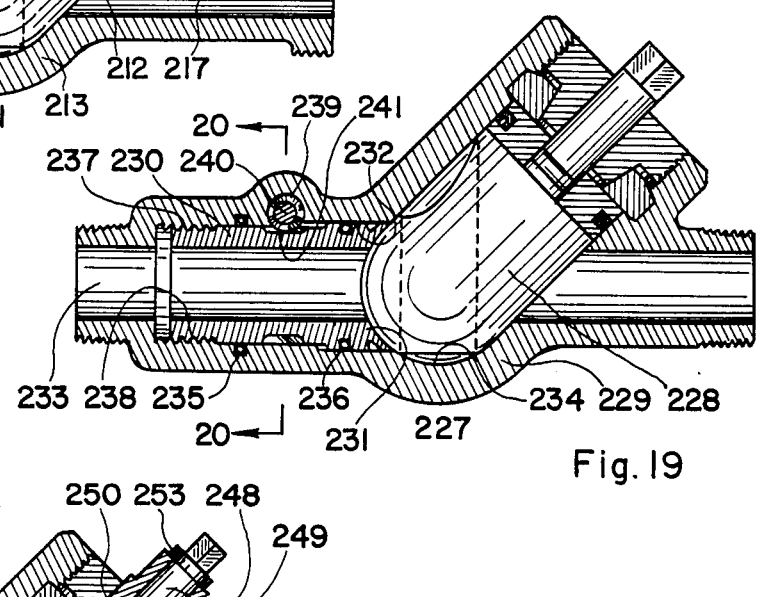
Fig. 19
Fig. 20
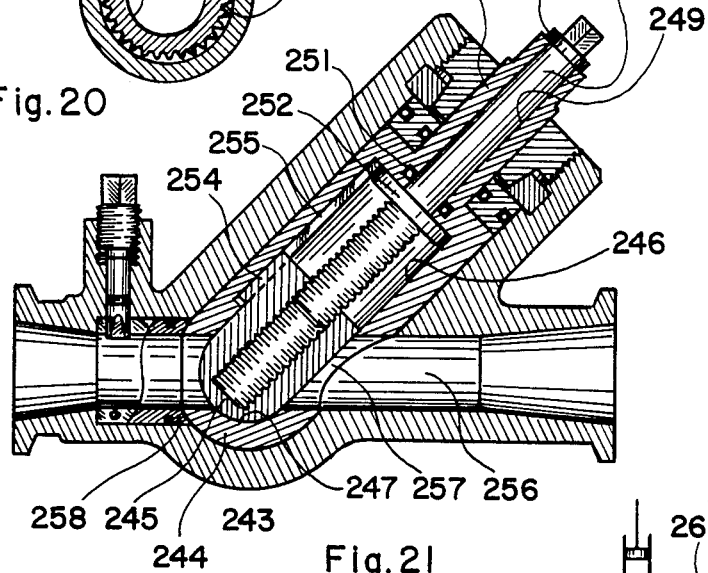
Fig. 21
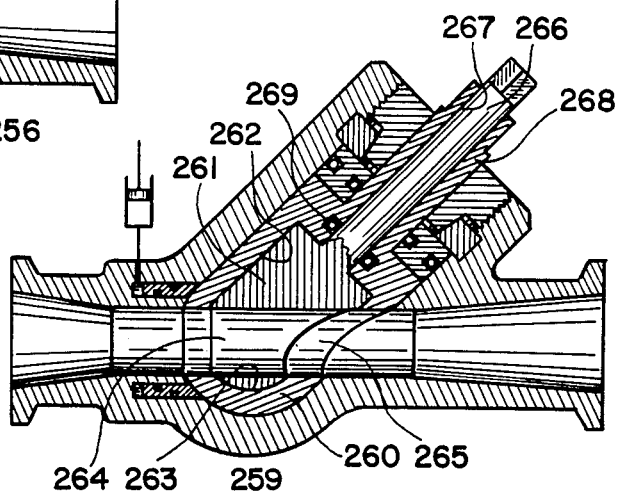
Fig. 22

BALL PLUG VALVE

This patent application is a continuation-in-part application to patent application Ser. No. 348,878 entitled "Ball-Plug Valve" filed on Feb. 16, 1982, which is now abandoned.

The primary object of the present invention is to provide the ball plug valves providing the advantage of the ball valve in the shut-off characteristics and the advantage of the cylindrical plug valve in the strength and simplicity in the construction.

Another object of the present invention is to provide the ball plug valves having a large bearing surface area for the ball plug in order to support the ball plug under extreme pressure.

A further object of the present invention is to provide the ball plug valves wherein the seating pressure on the annular seals disposed intermediate two mating hemispherical surfaces respectively belonging to the ball plug and the matching cavity in the valve body is isolated from the bearing pressure intermediate two cylindrical surfaces respectively belonging to the ball plug and the matching cavity in the valve body.

Yet another object of the present invention is to provide the ball plug valves with the variable seating pressure on the annular seal disposed intermediate two mating hemispherical surfaces respectively belonging to the ball plug and the matching cavity in the valve body, which seating pressure is controlled by an internal or external means.

Yet a further object of the present invention is to provide the ball plug valves that can be easily opened and closed under very high pressure.

Still another object of the present invention is to provide the ball plug valves wherein the abrasion on the annular seals disposed intermediate two mating hemispherical surfaces respectively belonging to the ball plug and the matching cavity in the valve body during the opening and closing of the valve is eliminated.

Still a further object of the present invention is to provide the ball plug valves including means for throttling without exposing the annular seals disposed intermediate two mating hemispherical surfaces respectively belonging to the ball plug and the matching cavity in the valve body to the high speed fluid stream.

Additionally another object of the present invention is to provide the ball valves with a variable seating pressure on the seal, which variable seating pressure is controlled by an internal or external means.

Additionally a further object of the present invention is to provide the tube and pipe coupling means for the installation of the ball plug valves, that is particularly adaptable to the extremely high pressure applications.

These and other objects of the present invention will become clear as the description of the present invention proceeds. The present invention may be described with great clarity and specificity by referring to the following figures:

FIG. 13 illustrates a cross section of a ball plug valve showing another embodiment of the annular seal disposed in the valve body of which seating pressure is controlled by an external mechanical means.

FIG. 14 illustrates a cross section of a ball plug valve showing a further embodiment of the annular seal disposed in the valve body of which seating pressure is controlled by an external mechanical means.

FIG. 15 illustrates a cross section of a ball plug valve showing yet another embodiment of the annular seal disposed in the valve body of which seating pressure is controlled by an external mechanical means.

FIG. 16 illustrates a cross section of a ball plug valve of FIG. 15 taken along a plane 16—16 as shown in FIG. 15.

FIG. 17 illustrates a cross section of a ball plug valve with a first annular seal disposed around the cylindrical section of the ball plug and a second annular seal disposed in the valve body of which seating pressure is controlled by an external means.

FIG. 18 illustrates a cross section of a ball plug valve with an annular seal incorporated into a ferrule slidably engaging the valve body, of which seating pressure is controlled by an external means.

FIG. 19 illustrates a cross section of a ball plug valve showing yet a further embodiment of the annular seal disposed in the valve body of which seating pressure is controlled by an external means.

FIG. 20 illustrates a cross section of the ball plug valve of FIG. 19 taken along a plane 20—20 as shown in FIG. 19.

FIG. 21 illustrates a cross section of a ball plug valve with an annular seal of variable seating pressure, which ball plug valve further includes a gate slidably disposed within the ball plug for throttling under extreme pressure.

FIG. 22 illustrates a cross section of a ball plug valve with an annular seal of variable seating pressure, which ball plug valve further includes a second ball plug rotatably disposed within the ball plug for throttling under extreme pressure.

Figure 1:
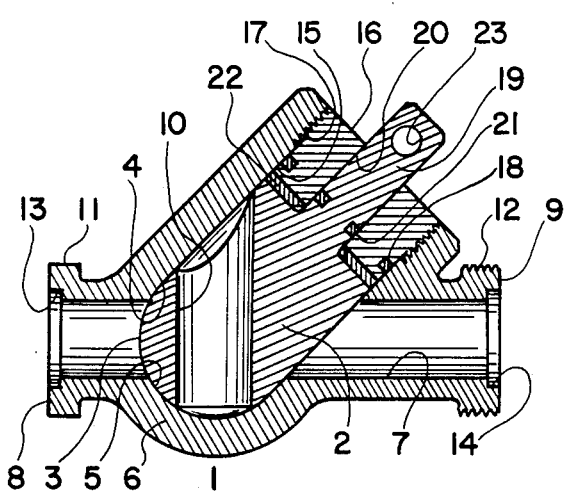
FIG. 1 illustrates a cross section of a ball plug valve constructed in accordance with the principles of the present invention, which cross section is taken along a plane including the central axis of the ball plug and that of the fluid passage hole through the valve body, that shows the fundamental construction of the ball plug valves.

In FIG. 1, there is shown a cross section of a ball plug valve 1 constructed in accordance with the principles of the present invention, which cross section is taken along a plane including the central axis of the ball plug and that of the fluid passage hole, wherein the fundamental construction of a ball plug valve is shown. The ball plug valve 1 comprises the ball plug 2 of a cylindrical geometry with a hemispherical end 3 that rotatably engages a matching cylindrical cavity 4 with a closed hemispherical end 5 included in the valve body 6 in a close tolerance. The valve body 6 further includes a fluid passage hole 7 extending from one extremity 8 to the other extremity 9 of the valve body 6. The central axis of the fluid passage hole 7 substantially passes through the center of the spherical surface including the closed hemispherical end 5 of the cylindrical cavity 4 and substantially intersects the central axis of the cylindrical cavity 4 at an oblique angle. The ball plug 2 includes a through hole 10 having a diameter substantially equal to the diameter of the fluid passage hole 7, of which central axis substantially passes through the center of the spherical surface including the hemispherical end 3 and substantially intersects the central axis of the ball plug 2 at an oblique angle. Each of the extremities of the fluid passage 7 includes the connection means 11 and 12 and the seal grooves 13 and 14, respectively, for connecting the ball plug valve 1 to the pipe line. The open end 15 of the cylindrical cavity 4 is plugged up by the closure 16 retained in position by the thread means 17, which closure 16 seals off the cylindrical cavity 4 in a leak-proof manner by means of the ring seal 18. The extremity of the ball plug 2 opposite to the hemispherical end 3 is reduced in the diameter providing the stem 19 which rotatably engages and extends through a hole 20 centrally disposed through the cap 16 wherein the ring seal 21 seals off the cylindrical cavity 4 in a leak-proof manner. A thrust bearing or thrust washer 22 is disposed intermediate the ball plug 2 and the closure 16 around the stem 19 in order to facilitate an easy rotation of the ball plug 2. The outer extremity of the stem 19 is provided with a connection means 23 for connecting the stem 19 to a rotating means for the rotation of the ball plug 2. It is preferred to use the oblique angle between the central axis of the fluid passage hole 7 and that of the cylindrical cavity 4 as well as the oblique angle between the central axis of the through hole 10 and that of the ball plug 2 substantially equal to 45 degrees. However, other values may be used for said oblique angle to suit the specific operating conditions. The fit between the ball plug 2 and the cylindrical cavity 4 has to be of close tolerance. In order to obtain a drip-proof closure of the ball plug valve 1, it is particularly important to make two mating hemispherical surfaces 3 an 5 respectively belonging to the ball plug 2 and the cylindrical cavity 4 to fit to one another with zero clearance in a region around the fluid passage hole 7 adjacent to the cylindrical cavity 4.

When the ball plug 2 is rotated to the "fully closed" position as shown in FIG. 1, the through hole 10 included in the ball plug 2 takes a position substantially perpendicular to the central axis of the fluid passage hole 7 included in the valve body 6 and, consequently, the ball plug 2 blocks the fluid passage resulting in the shut-off of the ball plug valve. When the ball plug 2 is rotated to the "fully open" position, the through hole 10 in the ball plug 2 lines up with the fluid passage hole 7 in the valve body 6 and, consequently, provides a straight-through fluid passage. If the ball plug valve 1 is installed on a pipe line wherein the extremity 9 of the fluid passage hole 7 is connected to the high pressure side of the pipe line, the fluid pressure acting on the ball plug 2 creates a thrust force on the ball plug 2 in the direction parallel to the central axis of the ball plug 2, which thrust force generally acts in such a direction that presses two mating hemispherical surfaces 3 and 5 and, thus, providing a leak-proof shut-off of the ball plug valve 1. It should be understood that such a thrust force on the ball plug 2 makes the ball plug 2 difficult to rotate and causes an abrasion on two mating hemispherical surfaces 3 and 5, while it enhances the leak-proof shut-off of the valve. Therefore, it is important to choose the optimum thrust on the ball plug for a successful operation of the ball plug valve. One of the greatest advantage provided by the ball plug valve is that the thrust force on the ball plug can be controlled in the direction and magnitude by properly sizing the diameter of the stem 19 relative to the diameter of the fluid passage hole 7 and by using the different degree of tightening of the cap 16. For example, when the diameter of the stem 19 is made substantially equal to 0.84 times of the diameter of the fluid passage hole 7, the axial thrust on the ball plug 2 created by the fluid pressure vanishes at the closed position while the ball plug 2 experiences an axial thrust that tends to separate two mating hemispherical surfaces 3 and 5 from one another at the open position, which state is ideal to install a resilient annular seal with variable seating pressure intermediate two mating hemispherical surfaces 3 and 5 as to be explained in conjunction with FIGS. 10 through 20. By properly selecting the size of the stem 19 relative to the size of the fluid passage hole 7 and using the preloading on the thrust by means of the closure 16, any desirable amount of the thrust force on the ball plug 2 can be obtained. It is important to limit the thrust force on the ball plug 2 to a reasonably small value to facilitate an easy rotation of the ball plug as well as to prevent the abrasion on two mating hemispherical surfaces 3 5, while install a resilient annular seal intermediate two mating hemispherical surfaces 3 and 5 to obtain a leak-proof shut-off of the ball plug valve as shown in FIGS. 4 through 20. It should be mentioned that the angle of the rotation for the ball plug 2 between the "fully open" and "fully closed" positions is substantially equal to 180 degrees when the oblique angles between the central axis of the fluid passage hole 7 and that of the cylindrical cavity 4 is substantially equal to 45 degrees. For smaller oblique angles, the angle of rotation for the ball plug 2 between the fully open and fully closed positions is in the range greater than 90 degrees and less than 180 degrees. The construction of the ball plug valve 1 shown in FIG. 1 illustrates the simplest construction representing a ball plug valve comprising the ball plug and the valve body made of the uniform solid material as well as those parts lined with materials different from the base material comprising those parts, which lining may be for the leak-proof shutoff or for the protection of the parts from abrasion and corrosion.

Figure 2:
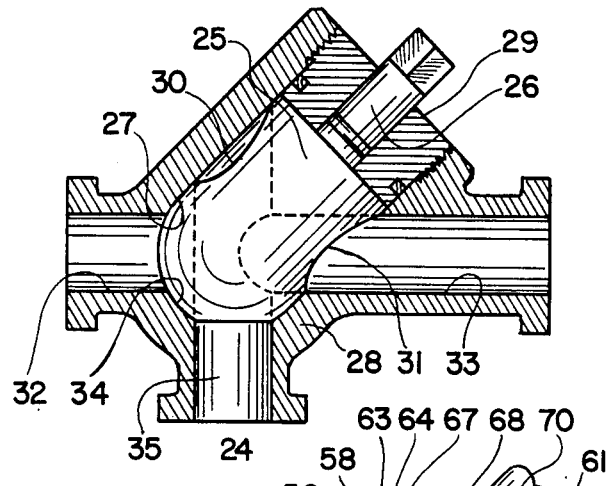
FIG. 2 illustrates a cross section of a three-way ball plug valve.

In FIG. 2 there is shown a cross section of a three-way ball plug valve 24, which cross section is taken along a plane including the central axis of the fluid passage holes and that of the cylindrical cavity. The three-way ball plug valve 24 comprises the ball plug 25 with a stem 26 rotatably engaging a matching cylindrical cavity 27 included in the valve body 28, which cylindrical cavity is sealed off by a closure 29 in the construction similar to that of the ball plug valve 1 shown in FIG. 1. The ball plug 25 includes a through hole 30 of which central axis substantially passes through the center of the spherical surface including the hemispherical end of the ball plug 25 and substantially intersects the central axis of the ball plug 25 at an oblique angle. The ball plug 25 further includes a branching hole 31 branching off from the through hole 30, of which central axis substantially passes through the center of the spherical surface including the hemispherical end of the ball plug 25 and substantially intersects the central axis of the ball plug 25 at an oblique angle. The valve body 28 includes a straight-through fluid passage holes 32 and 33 having the common central axis which substantially passes through the center of the spherical surface including the closed hemispherical end 34 of the cylindrical cavity 27 and substantially intersects the central axis of the cylindrical cavity 27 at an oblique angle. The valve body 28 further includes a branching fluid passage hole 35 branching off from the straight-through fluid passage holes 32 and 33, of which central axis substantially passes through the center of the spherical surface including the closed hemispherical end 34 of the cylindrical cavity 27 and substantially intersects the central axis of the cylindrical cavity 27 at an oblique angle. When the ball plug 25 is rotated to the first open position, the fluid passage hole 33 is connected to the fluid passage hole 35 by the branching hole 31 and one half of the through hole 30 included in the ball plug 25, as shown in FIG. 2, while the fluid passage hole 32 is shut-off by the ball plug 25. When the ball plug 25 is rotated to the second open position, the through hole 30 included in the ball plug 25 lines up with the through fluid passage holes 32 and 33, while the branching fluid passage hole 35 is shut-off by the ball plug 25.

Figure 3:
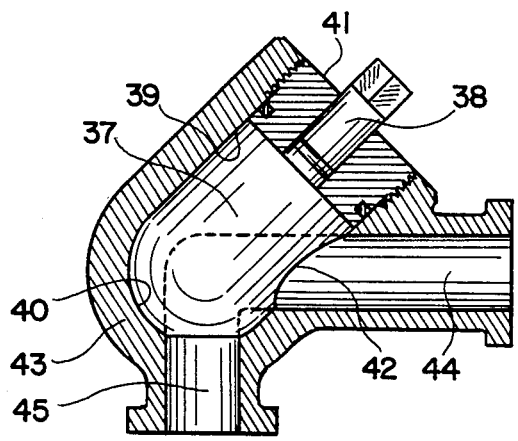
FIG. 3 illustrates a cross section of an angle-ball plug valve.

In FIG. 3 there is shown a cross section of an angle-ball plug valve 36 comprising a ball plug 37 with a stem 38 rotatably engaging a matching cylindrical cavity 39 with a closed hemispherical end 40, which cylindrical cavity is sealed off by the closure 41. The ball plug 37 includes an angled hole 42 of which central axis substantially pass through the center of the spherical surface including the hemispherical end of the ball plug 37 and substantially intersects the central axis of the ball plug 37 at an oblique angle. The valve body 43 includes the angled fluid passage holes 44 and 45 substantially perpendicular to one another, of which central axis substantially passes through the center of the spherical surface including the closed hemispherical end 40 of the cylindrical cavity 39 and substantially intersects the central axis of the cylindrical cavity 39 at an oblique angle. At the open position, the fluid passage holes 44 and 45 included in the valve body 43 are connected to one another by the angled hole 42 included in the ball plug 37, while the ball plug 37 shuts off the fluid passages 44 and 45 at the closed position.

Figure 4:
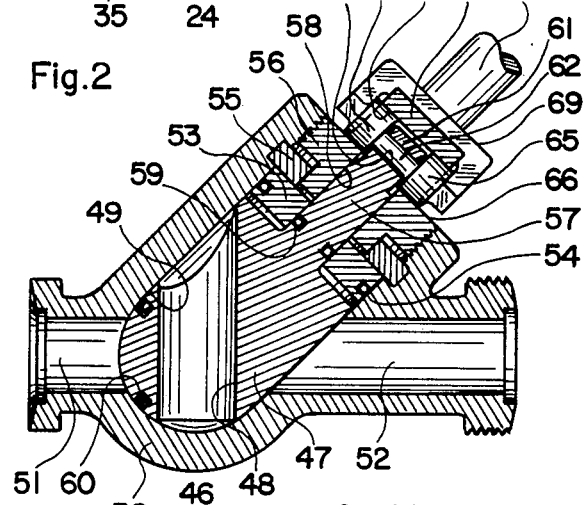
FIG. 4 illustrates a cross section of a straight-flow-through ball plug valve with an annular seal disposed on the ball plug.

In FIG. 4 there is shown a cross section of a ball plug valve 46 having essentially the same construction as the ball plug valve 1 shown in FIG. 1. The ball plug valve 46 comprises the ball plug 47 with a through hole 48 rotatably engaging a matching cylindrical cavity 49 included in the valve body 50, which valve body further includes the straight-through fluid passage holes 51 and 52. The cylindrical cavity 49 is sealed off by the double-wedge action reducer assembly including the plug 53 with a ring seal 54, the segmented retaining ring 55 and the cap 56, which assembly will be described in conjunction with FIGS. 34 and 35. The stem 57 of the ball plug 47 rotatably engages and extends through the hole 58 centrally disposed through the double-wedge action reducer assembly in a leak-proof manner as facilitated by the ring seal 59. In order to enhance the drip-proof shut off of the ball plug valve 46, a resilient annular seal 60 is disposed on the hemispherical portion of the ball plug 47 on a plane substantially parallel to the central axis of the through hole 48 included in the ball plug 47 and substantially perpendicular to the central axis of the fluid passage hole 51, which position of said plane is referred with respect to the ball plug rotated to the closed position of the ball plug valve, as shown in FIG. 4. The outer extremity 61 of the stem 57 is connected to a cam assembly attached to the handle by means of the pin 62 rotatably engaging the hole 63 disposed through the outer extremity of the stem 57, which pin 62 is connected to a pair of the eccentric rollers 64 and 65 rotatably confined intermediate the top face 66 of the closure 56 and the bottom face 67 of the over hanging member 68 rigidly attached to the closure 56. The pair of the eccentric rollers 64 and 65 are nonrotatably connected to the tuning fork-like extremity 69 of the handle 70; whereby, a flip of the handle in one direction lifts up the ball plug 47 over a small distance and, thus, floats the resilient annular seal 60 away from its seating surface for an easy and frictionless rotation of the ball plug 47 in opening and closing the ball plug valve 46. Another flip of the handle 70 in the other direction lowers the ball plug 47 back to the pressed-down position wherein the resilient annular seal 60 is pressed against its seating surface on the cylindrical cavity 49 which provides the drip-proof closure. Of course, it should be understood that the ball plug valve 46 operates equalyy well with a sample handle without the lifting-lowering cam mechanism shown in FIG. 4.

Figure 5:
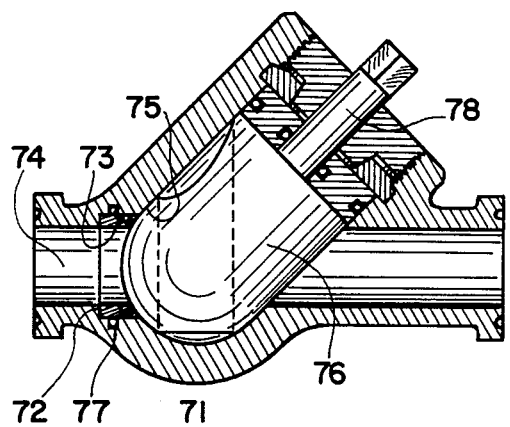
FIG. 5 illustrates a cross section of a ball plug valve with an annular seal disposed in the valve body.

In FIG. 5 there is shown a cross section of a ball plug valve 71 having essentially the same construction as the ball plug valve 46 shown in FIG. 4 minus the handle with the cam mechanism and the resilient annular seal disposed on the ball plug. The ball plug valve 71 includes a resilient annular seal 72 disposed in the counter bore 73 formed around the fluid passage hole 74 adjacent to the cylindrical cavity 75 in the valve body, which cylindrical cavity 75 is rotatably engaged by the ball plug 76. A ring seal 77 disposed around the resilient annular seal 72 provides a leak-proof fit between the resilient annular seal 72 and the inside surface of the counter bore 73.

It should be understood perfectly clearly that the word "resilient" being used in conjunction with the annular seal disposed intermediate two mating hemispherical surfaces respectively belonging to the ball plug and its matching cylindrical cavity implies the material property of the annular seal that deforms either in the periperal geometry or in the cross section geometry or both under the pressure into a shape conforming with the geometry of the surrounding parts. Therefore, the resilient annular seal includes all sort of seal of the annular geometry made of the hard materials such as the metal, ceramic and plastic or composite materials of high durometer as well as the soft materials such as the rubber and plastics or the composite materials of low durometer. It should be also understood very clearly that the stem 78 of the ball plug valve 71 may be connected to a simple handle without any lifting-lowering mechanism for the ball plug 76 as shown in FIG. 5 or to to the handle with the lifting-lowering mechanism as shown in FIGS. 4 or 6.

Figure 6:
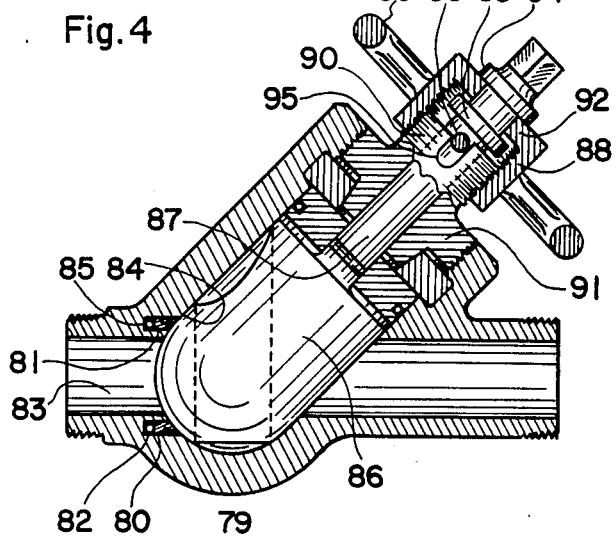
FIG. 6 illustrates a cross section of a ball plug valve showing another embodiment of an annular seal disposed in the valve body.

In FIG. 6 there is shown a cross section of a ball plug valve 79 having essentially the same construction as the ball plug valve 71 of FIG. 5 with the exception of the installation of the resilient annular seal. The resilient annular seal 80 is disposed in an annular groove 81 formed in the valve body 82 around the fluid passage hole 83 adjacent to the cylindrical cavity 84 included in the valve body, which resilient annular seal is backed up with a resilient ring seal 85 providing the leak-proof engagement between the resilient annular seal 80 and the valve body 82 as well as the spring bias means enhancing the drip-proof contact between the resilient annular seal 80 and the hemispherical surface of the ball plug 86. The stem 87 of the ball plug 86 includes a jack screw means comprising a female screw 88 with a handle wheel 89 threadedly engaging the male screw 90 formed on the coaxial extension of the cap 91. The female screw 88 is rotatably and nonslidably connected to the stem 87 as the flange 92 of the female screw 88 is confined between a pair of flanges 93 and 94 rigidly attached to the stem 87. The coaxial extension of the closure 91 including the male screw 90 has an open slot 95 engaged by a pin 96 rigidly attached to the stem 87; whereby, the stem 87 can be rotated only after said stem is lifted up to the point wherein the pin 96 becomes disengaged from the open slot 95. It should be understood that the jack screw mechanism as shown in FIG. 6 is to float the the ball plug 86 away from the resilient annular seal 80 for an easy and abrasionless rotation of said ball plug as well as to create the seating pressure on the resilient annular seal 80 for a drip-proof shut off of the ball plug valve 79. It should be mentioned that each ball plug valve shown in the present patent application as the illustrative embodiment or any other ball plug valves construted in accordance with the principles of the present invention may incorporate a simple rotation means without any lifting-lowering mechanism or a rotation means with lifting-lowering mechanism such as the eccentric cam rollers shown in FIG. 4 or the jack screw means shown in FIG. 6 as the illustrative embodiment for rotating the ball plug in opening and closing of the ball plug valve.

The ball plug valves illustrated in FIGS. 4, 5 and 6 readily reveals two outstanding characteristics of the ball plug valve which no other types of the valve possesses. Firstly, the ball plug valve closes and seals like a ball valve which is one of the best valve as far as the drip-proof shut-off characteristics is concerned. Secondly, the ball plug valve employs the construction similar to the conventional cylindrical plug valve which is one of the strongest valve as far as the capacity to withstand the high pressure is concerned. In the case of the conventional ball valve, the seat supporting the ball plays a dual role as a sealing member and as a bearing member holding the ball in the position against the load created by the fluid pressure. In general, the seal employed in the conventional ball valve has a surface area in contact with the ball which is insuffcient to support the ball under very high fluid pressure in spite of its excellent sealing capability against the high pressure provided by the axisymmetric geometry of said seat. Consequently, most conventional ball valve is limited to a pressure less than 5,000 psi in its application. In the case of the conventional cylindrical plug valve, the geometry of the sealing surfaces lacks the axisymmetry and, consquently, the parts involved in the sealing surfaces deforms in nonaxisymmetric manner under the influence of very high fluid pressure, for which reason the conventional cylindrical plug valves are prone to leak under very high fluid pressure in spite of its strength to withstand against the very high pressure. It is rather easy to recognize that the ball plug valve of the present invention employs the bearing surface arrangement supporting the plug similar to the conventional cylindrical plug valve wherein a plenty of the bearing surface area required to support the plug against the very high pressure is included, while it employs the axisymmetric geometry for the sealing surfaces like the conventional ball valve. As a consequence, the ball plug valve of the present invention is capable of providing a drip-proof shut off even at extremely high pressure better than any other type of the valves that the present day valve technology is providing. The ball plug valve is also easy to open and close even under very high pressure. In the case of the ball plug valve of the present invention, the seating pressure on the resilient annular seal disposed intermedate two mating hemispherical surfaces respectively belonging to the ball plug and its matching cylindrical cavity included in the valve body can be isolated from the bearing surface between two cylindrical surfaces respectively belonging to the cylindrical portion of the ball plug and its matching cylindrical cavity. In other words, said two mating cylindrical surfaces provide the bearing surface while said two mating hemispherical surfaces provide the sealing surface in the ball plug valve of the present invention. It is interesting to notice that the thrust force on the ball plug acting in the direction parallel to its central axis can be eliminated by sizing the diameter of the stem of the ball plug substantially equal to 0.84 times of the diameter of the resilient annular seal when the ball plug is positioned at the closed position. Consequently, the resultant force on the ball plug created by the fluid pressure is in the direction perpendicular to the central axis of the ball plug and, consequently, the rotation of the ball plug is reasonably easy like a shaft supported by the sleeve bearings even under very high pressure. It is generally desirable to provide a small thrust force on the ball plug to create a seating pressure on the resilient annular seal in order to obtain a drip-proof shut-off, which small amount of axial thrust can be created by properly sizing the stem of the ball plug relative to the diameter of the resilient annular seal or preloading the ball plug by tightening down the cap. The ball plug valve of the present invention provides a further advantage in incorporating the means for controlling the seating pressure on the resilient annular seal by an external source such as those mechanical means shown in FIGS. 4 and 6 or other means to be described in conjunction with FIGS. 10 through 20, which means facilitate the drip-proof shut-off as well as the easy and abrasionless rotation of the ball plug. It should be clearly understood that the cylindrical portion of the ball plug may have a diameter equal to or less or greater than the diameter of the hemispherical end of said ball plug in constructing the ball plug valve of the present invention.

Figure 7:
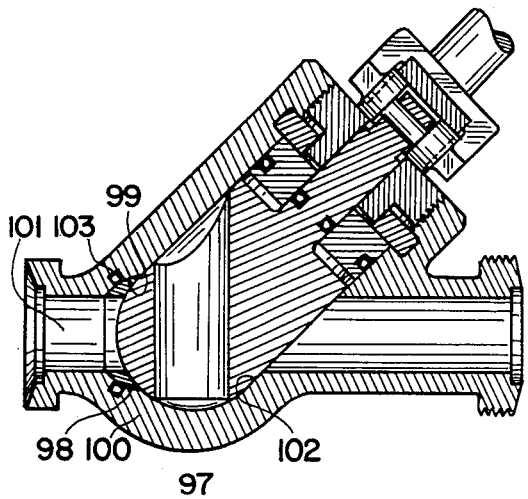
FIG. 7 illustrates a cross section of a ball plug valve with an inserted conical annular seal.

In FIG. 7 there is shown a cross section of a ball plug valve 97 having essentially the same construction as the ball plug valve 46 of FIG. 4 with the exception of the installation of the resilient annular seal. The ball plug valve 97 includes the inserted resilient conical annular seal 98 disposed within a matching seat 99 formed in the valve body 100 around the fluid passage hole 101 adjacent the cylindrical cavity 102 included in the valve body. A ring seal 103 disposed intermediate the inserted resilient conical annular seal 98 and its matching seat 99 provides the leak-proof fit therebetween.

Figure 8:
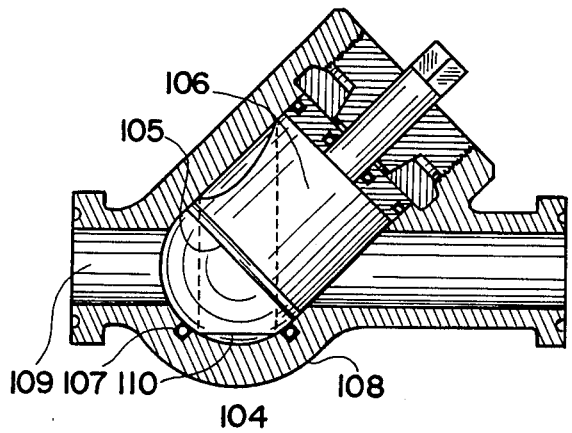
FIG. 8 illustrates a cross section of a ball plug valve with a first annular seal disposed around the cylindrical section of the ball plug and a second annular seal disposed in the valve body.

In FIG. 8 there is shown a cross section of a ball plug valve 104 having essentially the same construction as the ball plug valve 71 of FIG. 5 with the exception of the installation of the resilient annular seal. The ball plug valve 104 includes a first resilient annular seal 105 disposed around the cylindrical portion of the ball plug 106 and a second resilient annular seal 107 disposed in an annular groove formed in the valve body 108 on a plane substantially parallel to the central axis of the fluid passage hole 109 and substantially perpendicular to the central axis of the through hole 110 included in the ball plug 106 rotated to the closed position.

Figure 9:
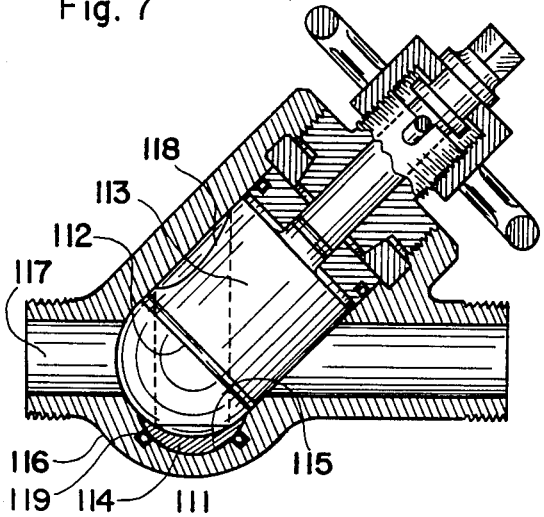
FIG. 9 illustrates a cross section of a ball plug valve with a first annular seal disposed around the cylindrical section of the ball plug and an inserted conical seal disposed in the valve body.

In FIG. 9 there is shown a cross section of a ball plug valve 111 having essentially the same construction as the ball plug valve 79 shown in FIG. 6 with the exception of the installation of the resilient annular seal. The ball plug valve 111 includes a first resilient annular seal 112 disposed around the cylindrical portion of the ball plug 113 and an inserted resilient conical disc seal 114 disposed in the matching seat 115 formed in the valve body 116 on a plane substantially parallel to the central axis of the fluid passage hole 117 and substantially perpendicular to the central axis of the through hole 118 included in the ball plug 113 rotated to the closed position. A resilient ring seal 119 is disposed intermediate the inserted resilient conical disc seal 114 and the valve body 116.

Figure 10:
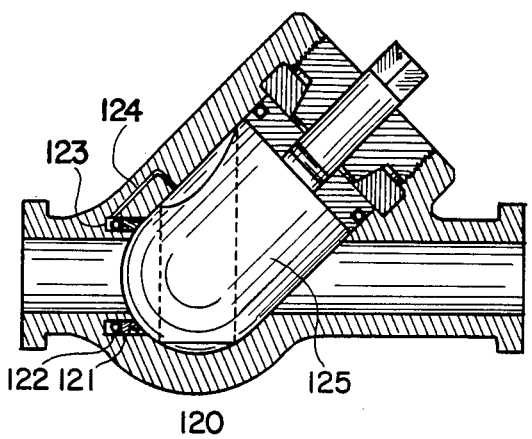
FIG. 10 illustrates a cross section of a ball plug valve with an annular seal disposed in the valve body of which seating pressure is controlled by an internal hydraulic means.

In FIG. 10 there is shown a cross section of a ball plug valve 120 having essentially the same structure as the ball plug valve 79 of FIG. 6 with the exception of the handle arrangement and the internal hydraulic means for controling the seating pressure on the resilient annular seal. The ball plug valve 120 includes a resilient annular seal 121 backed up by a resilient ring seal 122, of which combination is disposed in the annular groove 123 wherein the bottom of said groove is connected to the high pressure side of the ball plug valve by a small caliber hole 124. When the ball plug 125 is rotated to the closed position, the fluid pressure of the high pressure side of the valve presses the resilient annular seal 121 and the back up ring seal 122 against the ball plug 125 resulting in a drip-proof shut-off of the ball plug valve 120. When the ball plug 125 is rotated to the open position, the pressure acting on two ends of the resilient annular seal 121 balances one another and, consequently, the seating pressure between the resilient annular seal 121 and the ball plug 125 is eliminated for an easy and frictionless rotation of the ball plug 125.

Figure 11:
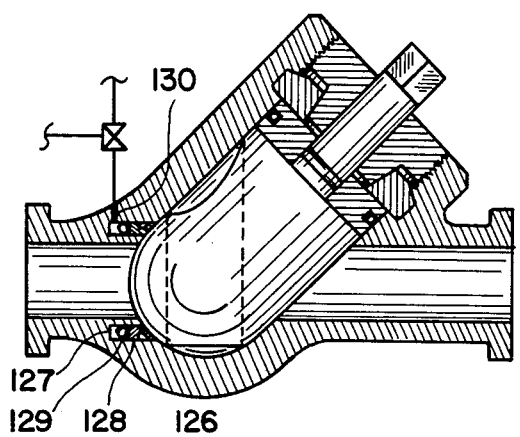
FIG. 11 illustrates a cross section of a ball plug valve with an annular seal disposed in the valve body of which seating pressure is controlled by an external hydraulic means.

In FIG. 11 there is shown a cross section of a ball plug valve 126 having essentially the same construction as the ball plug valve 120 shown in FIG. 10 with the exception of the hydraulic means controlling the seating pressure on the resilient annular seal. The bottom of the annular groove 127 receiving the resilient annular seal 128 and the back up ring seal 129 is connected to an external hydraulic pressure source by the small caliber hole 130; whereby, the seating pressure on the resilient annular seal 128 is controlled at will by means of the external hydraulic source.

Figure 12:
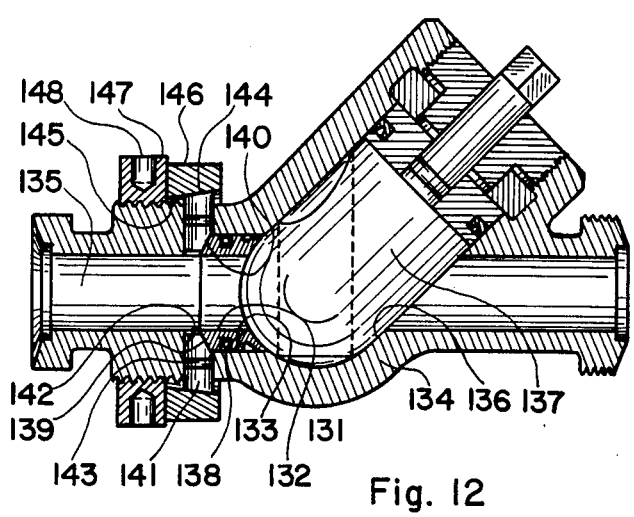
FIG. 12 illustrates a cross section of a ball plug valve with an annular seal disposed in the valve body of which seating pressure is controlled by an external mechanical means.

In FIG. 12 there is shown a cross section of a ball plug valve 131 having essentially the same construction as the ball plug valve 46 of FIG. 4 with the exception of the arrangement of the resilient annular seal. The resilient annular seal 132 of the ball plug valve 131 is disposed in a counter bore 133 formed in the valve body 134 around the fluid passage hole 135 adjacent to the cylindrical cavity 136 accepting the ball plug 137 in a rotating relationship wherein the installation of the resilient annular seal 132 in the counter bore 133 is made leak-proof by means of the resilient ring seal 138 disposed around said resilient annualr seal. Here it should be clearly understood that the resilient annular seal 132 comprises the resilient sealing extremity adjacent to the ball plug 137 connected to the rigid sleeve, for which combination the word "resilient annular seal" stands. The end face 139 of the resilient annular seal 132 opposite to the other end in contact with the ball plug 137 is tapered in a conical geometry, which tapered end 139 is supported by a plurality of the tapered faces 140 disposed on one side of the plurality of the support pins 141 adjacent to the inner extremities of said support pins. The pluralities of the support pins 141 engage and extend through a matching plurality of the holes 142 disposed through the valve body 134 in the radial directions substantially perpendicular to the central axis of the fluid passage hole 135, which engagement is in a sliding relationship and in a leak-proof manner as facilitated by means of the resilient ring seals 143 disposed around each of the plurality of the support pins 141. The outer ends 144 of the plurality of the support pins 141 are tapered, which tapered ends are in contact with the tapered inner cylindrical surface 145 of the floating ring 146 disposed adjacent to the torque ring 147 with rotating means 148, which torque ring is threadedly engaging the male threads formed on the valve body 134 about the central axis of the fluid passage hole 135. Said arrangement of the resilient annular seal 132 enables to control the seating pressure between the resilient annular seal 132 and the ball plug 137 at will. The rotation of the torque ring 147 in one direction pushes the floating ring 146 in the first direction pressing the plurality of the support pins 141 inwardly, which movement, in turn, presses the resilient annuar seal 132 against the ball plug 137 providing a drip-proof shut-off for the ball plug valve 131. The rotation of the torque ring 147 in another opposite direction eliminates the seating pressure on the resilient annular seal 132 enabling an easy and frictionless rotation of the ball plug 137. The mechanical means for controlling the seating pressure on the resilient annular seal as shown in FIG. 12 is particularly effective in the construction of the ball plug valves applied to the very high pressure, which controlling means may be employed to tighten and loose the seating pressure on the resilient annular seal every time before and after rotating the ball plug in opening and closing the ball plug valve, or it may be used to adjust the seating pressure on the resilient annular seal on semipermanent basis in counteracting the loss of the seating pressure resulting from the wear of the resilient annular seal after repeated opening and closing of the ball plug valve over a long period of the time.

In FIG. 13 there is shown a cross section of a ball plug valve 149 having essentially the same construction as the ball plug valve 131 of FIG. 12, wherein the means for controlling the seating pressure on the resilient annular seal is arranged in different way from that of FIG. 12. The resilient annular seal with a rigid back up sleeve 150 is disposed in an annular groove 151 formed in the valve body 152 around the fluid passage hole 153 adjacent to the cylindrical cavity 154 wherein the pair of the resilient ring seals 155 and 156 provide the leak-proof fits between the resilient annular seal 150 and the valve body 152. The end 157 of the resilient annular seal 150 opposite to the other end in contact with the ball plug 158 is locked into a plurality of the wedge pins 159 of which wedge face 160 is mated to the matching wedge face 161 included in the plurality of the support pins 162. The plurality of the support pins 162 can be pressed inwardly by the torque ring 163 in contact with the floating ring 164 in the same manner as described in conjunction with FIG. 12.

In FIG. 14 there is shown a cross section of a ball plug valve 165 having essentially the same construction as the ball plug valve 149 shown in FIG. 13 with the exception of the arrangement of the resilient annular seal backed up with a rigid sleeve 166, which is disposed in a counter bore 167 formed in the valve body 172 around the fluid passage hole 168 adjacent to the cylindrical cavity 169 wherein the plurality of the resilient ring seals 170 and 171 provide a leak-proof engagement between the resilient annular seal with a rigid back up sleeve 166 and the valve body 172. A plurality of the wedge pins 173 are anchored in the groove 174 disposed around the outer cylindrical surface of the rigid back up sleeve of the resilient annular seal 166, each of which plurality of the wedge pins is mated to each of the plurality of the support pins 175 related to the floating ring 176 and the torque ring 177 in the same manner as described in conjunction with FIG. 13.

In FIG. 15 there is shown a cross section of a ball plug valve 178 having essentially the same construction as the ball plug valve shown in FIG. 14 wherein a different arrangement is employed in the installation of the resilient annular seal with variable seating pressure. The resilient annular seal with a rigid back up sleeve 179 disposed in a counter bore 180 around the fluid passage hole 181 has an end face 182 having the slope 183 provided in a geometry substantially symmetric with respect to a plane including the central axis of the fluid passage hole 181, which sloped end face 182 is mated to the matching slope 184 included in one end of the split sleeve 185. The other end 186 of the split sleeve 185 is in contact with the bottom of the counter bore 180. The first gap 187 between two halves of the split sleeve 185 is slidably engaged by the wedge 188 disposed on the wedge pin 189 near its inner extremity, which wedge pin 189 is provided with a resilient ring seal 190 and is backed up by the thrust bearing or washer 191 and a jack screw means 192. The second gap 193 between two halves of the split sleeve 185 may include a guide means 194 for guiding two halves of the split sleeve during the movement therebetween. The resilient ring seal 195 disposed around the resilient annular seal with a rigid back up sleeve 179 provides a leak-proof engagement between the resilient annular seal 179 and the counter bore 180 in a sliding relationship. The seating pressure between the resilient annular seal 179 and the ball plug can be controlled at will by using the jack screw means 192.

In FIG. 16, there is shown a cross section 16—16 of the ball plug valve 178 as shown in FIG. 15, which illustrates the arrangement of two halves 197 and 198 of the split sleeve 185 wherein the first gap 187 is engaged by the wedge 188 of the wedge pin 189 having a resilient ring seal 190 and backed up with the thrust bearing or washer 191 and the jack screw means 192. The second gap 193 between two halves 197 and 198 of the split sleeve 185 may function well with or without the guide means 194.

In FIG. 17 there is shown a cross section of a ball plug valve 199 having essentially the same construction as the ball plug valve 178 of FIG. 15 with different resilient annular seal arrangement. The ball plug 201 includes a first resilient annular seal 200 disposed around the cylindrical portion of the ball plug 201 and a second resilient annular seal 202 disposed in an annular groove 203 formed in the valve body 204 adjacent to the cylindrical cavity 205 on a plane substantially parallel to the central axis of the fluid passage hole 206 and substantially perpendicular to a plane including the central axis of the cylindrical cavity 205 wherein a leak-proof engagement therebetween is provided by a pair of the resilient ring seals 207 and 208 which pair of the resilient ring seals may be substituted with single resilient ring seal installed in the bottom of the annular groove 203. The bottom 209 of the annular groove 203 is connected to an external hydraulic pressure source by means of the small caliber hole 210; whereby, the seating pressure on the resilient annular seal 202 can be controlled at will by varying the pressure of the external hydraulic source.

In FIG. 18 there is shown a cross section of a ball plug valve 211 having essentially the same assembly including the ball plug 212 and the valve body 213 as the ball plug valve 199 shown in FIG. 17. However, the resilient annular seal 214 is included in a bushing 215 providing a fluid passage hole 216 lined up with the fluid passage hole 217, which bushing 215 engages the bore 218 disposed in the valve body 213 in a sliding relationship in a leak-proof manner as facilitated by a plurality of the resilient ring seals 219 and 220 disposed around the bushing 215. The bushing 215 includes a connection means 221 at its outer extremity for connecting to the pipe line and a flange 222 confined within a groove 223 disposed on the inner cylindrical surface of the torque ring 224 threadedly engaging the valve body 213 by means of the thread 225 disposed about the central axis of the fluid passage hole 217, which torque ring 224 can be rotated by using the rotating means 225. The rotation of the torque ring 224 in one direction establishes the seating pressure on the resilient annular seal and in the another opposite direction nullifies the seating pressure.

In FIG. 19 there is shown a cross section of a ball plug valve 227 having essentially the same assembly including the ball plug 228 and the valve body 229 as the ball plug valve 178 of FIG. 15 with different arrangement for the resilient annular seal. The rigid sleeve 230 including the resilient annular seal 231 is disposed in a counter bore 232 formed in the valve body 229 around the fluid passage hole 233 adjacent to the cylindrical cavity 234 wherein the plurality of the resilient ring seals 235 and 236 provide the leak-proof fits. The male thread 237 disposed on the rigid sleeve 230 near the extremity opposite to the other extremity adjacent to the ball plug 228 engages the female thread 238 disposed in the counterbore 232 near its bottom. The worm gear 239 nonrotatably installted on the shaft 240 engages the gear teeth 241 formed on the outer cylindrical surface of the rigid sleeve 230. By rotating the shaft 240 connected to the worm gear 239 in one or the other direction, the seating pressure on the resilient annular seal 231 can be established or nullified.

In FIG. 20 there is shown a cross section 20—20 of the ball plug valve 227 as shown in FIG. 19 wherein the worm gear 239 installed on the shaft 240 engaging the gear teeth 241 disposed on the outer cylindrical surface of the rigid sleeve 230 is clearly shown. The shaft 240 includes a rotating means 242.

In FIG. 21 there is shown a cross section of a ball plug valve 243 having essentially the same construction as the ball plug valve 178 of FIG. 15, wherein a throttling means is further included. The ball plug 244 includes a second ball plug 245 slidably engaging a second cylindrical cavity 246 with a closed hemispherical end 247 included in the first ball plug 244, which second ball plug 245 is threadedly engaged by a second stem 248 rotatably engaging and extending through the hole 249 coaxially disposed in the first stem 250 connected to the first ball plug 244, which engagement is made leak-proof by means of the resilient ring seal 251 disposed around the second stem 248. The axial movement of the second stem 248 is prohibited by means of the pair of the flanges 252 and 253, while the rotational movement of the second ball plug 245 is prohibited by means of the key 254 rigidly connected to the second ball plug 245 slidably engaging the key way 255 disposed on the wall of the second cylindrical cavity 246. The rotation of the second stem 248 in one or the other direction results in the movement of the second ball plug 245 in the direction parallel to the central axis of the second cylindrical cavity 247, which movement of the second ball plug 245 throttles the fluid flow through the fluid passage hole 256 as the through hole 257 included in the first ball plug 244 is partially or fully blocked by the second ball plug 245. In the operation of the ball plug valve 243 for a throttling operation, the first ball plug 244 is usually rotated to the fully open or fully closed position, while the second ball plug 245 is used to throttle the flow through said ball plug valve, which mode of the operation provids an advantage in that the resilient annular seal 258 used for shut-off is not exposed to the high speed fluid stream and, consequently, the leak-proof shut-off capability of the ball plug valve 243 is preserved against the wear and tear created by the high speed fluid stream. It should be understood that the second ball plug 245 may be substituted with a gate body of geometry different from a ball plug that operates in the manner similar to the gate in the conventional gate valve.

In FIG. 22 there is shown a cross section of a ball plug valve 259 having essentially the same construction as the ball plug valve 126 of FIG. 11, wherein a throttling means is further included.. The first ball plug 260 includes a second ball plug 261 rotatably engaging a matching second cylindrical cavity 262 with a closed hemispherical end 263 included in the first ball plug 260. The second ball plug 261 includes a through hole 264 that lines up with the through hole 265 of the first ball plug at one angular position and takes a position substantially perpendicular to the through hole 265 of the first ball plug 260 at another angular position. The second ball plug 261 is rigidly connected to a second stem 266 rotatably engaging and extending through the hole 267 disposed in the first stem 268 in a coaxial relationship, which engagement is made leak-proof by means of the resilient ring seal 269. As in the case of the throttling ball plug valve 243 shown in FIG. 21, the first ball plug 260 is used exclusively for shut-off only, while the second ball plug 261 is used to throttle the fluid flow through the ball plug valve 259 without damaging the resilient annular seal.

Figure 23:
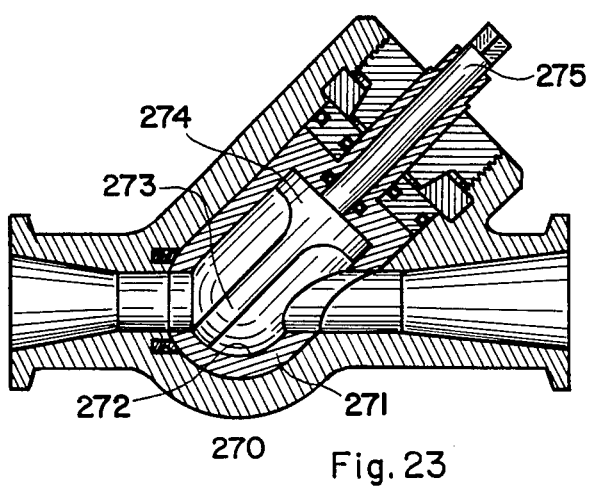
FIG. 23 illustrates a cross section of a ball plug valve with a fixed annular seal disposed in the valve body, which ball plug valve includes a disc rotatably disposed within the ball plug for throttling under extreme pressure.

In FIG. 23 there is shown a cross section of a ball plug valve 270 having essentially the same construction as the ball plug valve 79 of FIG. 6, wherein a throttling means is further incorporated. The ball plug 271 includes a cylindrical cavity 272 which is rotatably engaged by a disc 273 carved out of a ball plug 274 installed in the same manner as the second ball plug 261 of the ball plug valve 259 described in conjunction with FIG. 22. The throttling is accomplished by rotating the second stem 275 connected to the disc 273. Of course, a disc of geometry different from one carved out of a ball plug may be used in place of the disc shown in the illustrative embodiment shown in FIG. 23. It should be understood that the second blocking body slidably or rotatably included in the ball plug for the throttling as shown in FIGS. 21, 22 or 23 may be incorporated to any ball plug valve constructed in accordance with the principles of the present invention. For example, the particular arrangement of the blocking body included in the ball plug as shown in FIG. 21 can be installed in the ball plug of the ball plug valve shown in FIG. 22 and vice versa.

Figure 24:
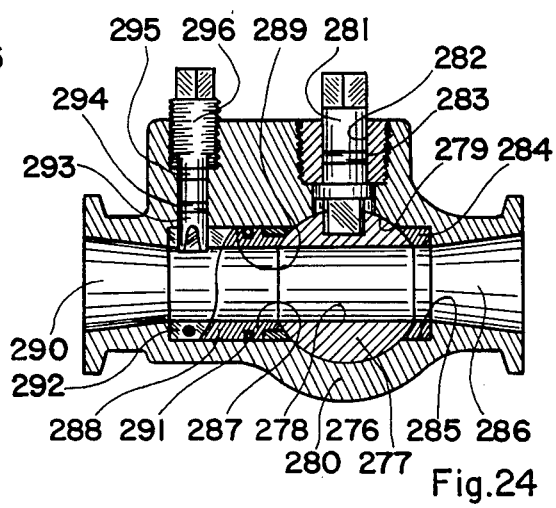
FIG. 24 illustrates a cross section of a ball valve with an annular seal of variable seating pressure controlled by an external means.

In FIG. 24 there is shown a cross section of a ball valve 276 employing the resilient annular seal with variable seating pressure. The ball valve 276 includes a ball 277 with a through hole 278 engaging a cavity 279 included in the valve body 280. A stem 281 connected to the ball 277 nonrigidly and nonrotatably engages and extends through the hole 282 disposed through the valve body 280 in a leak-proof manner as facilitated by means of the resilient ring seal 283. The stationary resilient annular seal 284 is disposed in a counter bore 285 formed around the fluid passage hole 286. The movable resilient annular seal 287 backed with a rigid sleeve 288 is disposed in a counter bore 289 formed around the fluid passage hole 290 adjacent to the ball 277 wherein a resilient ring seal 291 provides a leak-proof fit between the rigid sleeve 288 and the counter bore 289. The means for moving the rigid sleeve 288 over a small distance in controlling the seating pressure includes the split sleeve 292, the wedge pin 293 with a resilient ring seal 294, a thrust bearing or washer 295 and the jack screw means 296, of which contruction and function are the same as the corresponding elements described in conjunction with FIG. 15.

Figure 25:
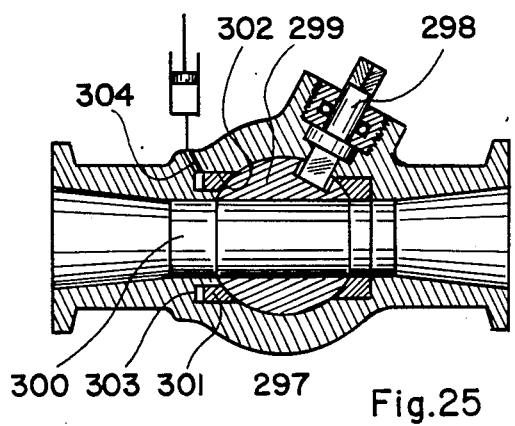
FIG. 25 illustrates a cross section of a ball valve showing another embodiment of the annular seal disposed in the valve body of which seating pressure is controlled by an external means.

In FIG. 25 there is shown a cross section of a ball valve 297 having essentially the same construction as the ball valve 276 shown in FIG. 24 with the exception of the arrangement of the slanted stem and the resilient annular seal with variable seating pressure. The stem 298 is nonrigidly and nonrotatably connected to the ball 299 in an oblique angle with respect to the central axis of the fluid passage hole 300 and, consequently, the stem 298 has to be rotated over an angle greater than 90 degrees and less than 180 degrees between the fully closed and fully open positions depending on the numerical value of the oblique angle employed in the installation of the stem 298. The movable resilient annular seal 301 is disposed in an annular groove 302 formed around the fluid passage hole 300 adjacent to the ball 299 wherein the bottom 303 of the annular groove 302 is connected to an external hydraulic pressure source by means of the small caliber hole 304. The seating pressure on the resilient annular seal 301 is controlled by varying the pressure in the external hydraulic source. It is clear that any one of the methods employed in controlling the seating pressure on the resilient annular seal included in the ball plug valves as shown by the illustrative embodiments illustrated in FIGS. 10 through 20 can be incorporated into the construction of the ball valve wherein the seating pressure on the resilient annular seal can be controlled by an external means as demonstrated in FIGS. 24 and 25.

Figure 26:
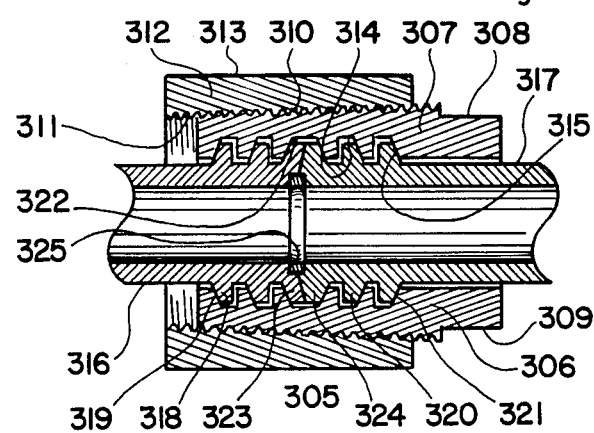
FIG. 26 illustrates a cross section of a double-wedge action coupling for joining the tubes and pipes under high pressure, which cross section is taken along a plane including the central axis of the fluid passage hole through the coupling.

In FIG. 26 there is shown a cross section of a double wedge action coupling used in joining two extremities of the pipes or tubes under high pressure, which cross section is taken along a plane including the central axis of the pipe or tube. The double wedge action coupling 305 includes a split tapered collar comprising two halves 306 and 307, each of which including the wrench holds 308 and 309 on one extremity of said split tapered collar. The outer cylindrical surface of said split collar is tapered and includes the tapered male thread 310, which engages the tapered female thread 311 included in the inner cylindrical surface of the closed collar 312 having a wrench hold 313 on the outer cylindrical surface. The inner cylindrical surfaces of two halves 306 and 307 of the split collar includes a plurality of the grooves 314 wherein the one side walls 315 of said grooves 314 facing the center plane equidividing said double wedge action coupling is sloped in such a way that the opening of the groove is wider than its bottom. In joining two extremities 316 and 317 of the pipes or tubes, one half of the plurality of the grooves 314 are engaged by a plurality of the matching flanges 318 with one face 319 sloped to mate the sloped wall 315 of the grooves 314, which flanges 318 are included in the first extremity 316 of the pipe or tube, while the other half of the plurality of the grooves 314 are engaged by the plurality of the matching flanges 320 with one face 321 sloped to mate the sloping wall 315 of the grooves 314, which flanges 320 are included in the second extremity 317 of the pipe or tube. The groove 322 of the split collar located on the center plane has both walls sloped and is engaged by two matching flanges 323 and 324 respectively disposed to each extremity 316 and 317 of the pipe or tube being joined to one another. The sealing means 325 is included intermediate two mating ends of the pipes or tubes in order to provide a leak-proof connection between two extremities of the pipes or tubes. There should be a sufficient amount of clearance between the nonsloping walls of the groove 314 and the nonsloping faces of the flanges 318 and 320 and a plenty of gap between two halves 306 and 307 of the split collar; whereby, when the split collar is screwed into the closed collar 312, two halves 306 and 307 of the split collar become pressed toward to one another,and, in turn, two extremities 316 and 317 of the pipes or tubes become pressed to one another as the result of the reaction created by the pressure exerted between the sloped faces of the flanges and the mating sloped walls of the grooves.

Figure 27:
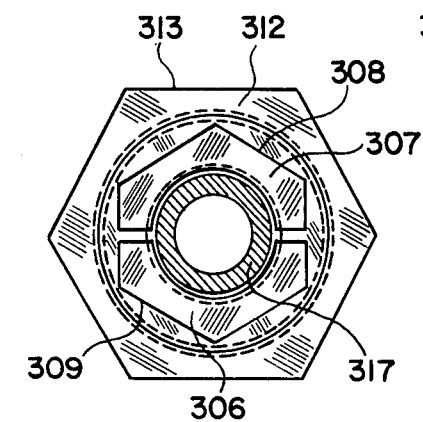
FIG. 27 illustrates an end view of the double-wedge action coupling shown in FIG. 26.

In FIG. 27 there is shown an end view of the double wedge action coupling 305 shown in FIG. 26.

Figure 28:
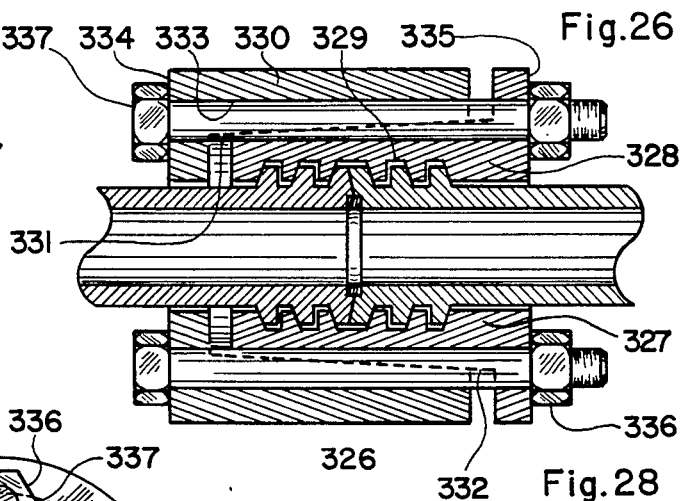
FIG. 28 illustrates a cross section of another double-wedge action coupling for high pressure application.

In FIG. 28 there is shown a cross section of another double wedge action coupling 326 comprising the split collar including two halves 327 and 328 having a plurality of the internal grooves 329 of the construction and function similar to corresponding grooves described in conjunction with FIG. 26, and the closed collar 330 of which inner tapered cylindrical surface 331 is engaged by the matching outer tapered cylindrical surface 332 of the split collar. The assembly of the double wedge action coupling including the split collar and the closed collar 330 includes a plurality of the holes 333 extending from one extremity 334 of the closed collar 330 to the other extremity 335 of the split collar, which holes 333 disposed in an axisymmetric pattern are oversized for the plurality of the bolts 337 extending through said holes. The coupling of two ends of the pipes or tubes including the plurality of the matching flanges engging the grooves disposed in the double wedge action coupling is accomplished by compressing two extremities 334 and 335 of the double wedge action coupling 326 toward to one another by tightening the nuts 336 on the bolts 337 extending through the holes 333.

Figure 29:
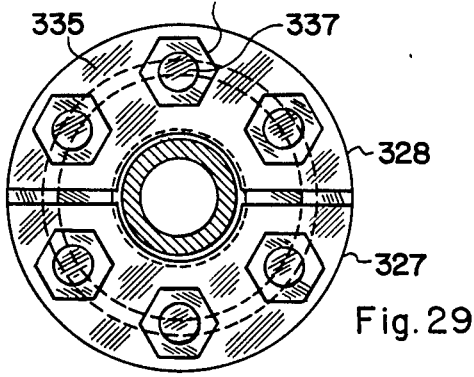
FIG. 29 illustrates an end view of the double-wedge action coupling shown in FIG. 28.

In FIG. 29 there is shown an end view of the double wedge action coupling 326 shown in FIG. 28.

Figure 30:
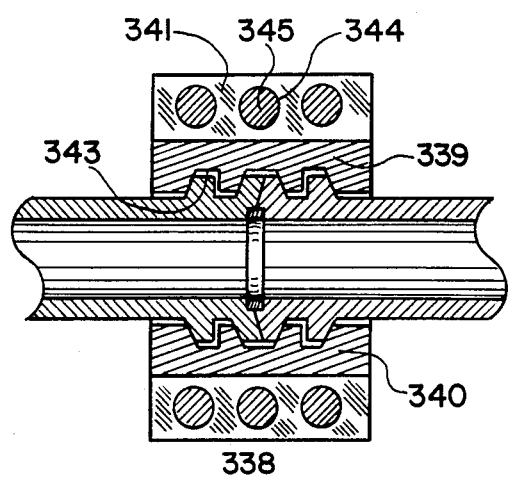
FIG. 30 illustrates a cross section of a further double-wedge action coupling.

In FIG. 30 there is shown a cross section of a further double wedge action coupling 338 comprising a split collar including two halves 339 and 340 and a split clamping collar including two halves 341 and 342 wherein the inner diameter of the split clamping collar is made slightly smaller than the outer diameter of the split collar, both of which cylindrical surfaces are of constant diameter without any taper. The inner cylindrical surface of the split collar includes a plurality of the grooves 343 having the construction and function similar to the corresponding elements described in conjunction with FIG. 26. Two halves 341 and 342 of the split clamping collar include a plurality of the holes 344 disposed substantially perpendicular to the parting plane and located to clear the onter surface of the split collar with the internal grooves 343, which holes 344 are engaged by a plurality of the bolts 345 extending from the first half 341 to the second half 342 where a plurality of nuts 346 are screwed on. The joining of two ends of the pipes or tubes including the plurality of the flanges matching to the plurality of the grooves 343 is accomplished by tightening the nuts 346 on the bolts 345.

Figure 31:
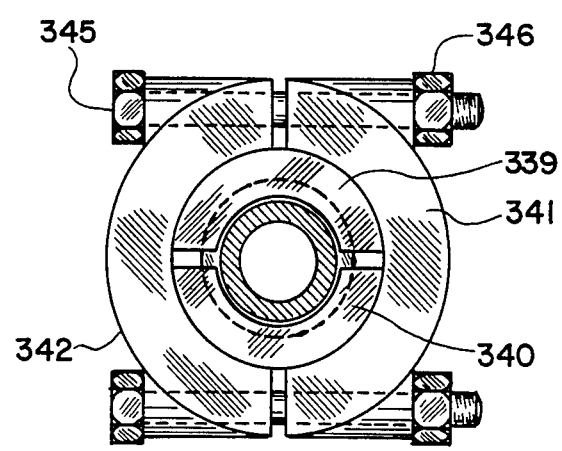
FIG. 31 illustrates an end view of the double-wedge action coupling shown in FIG. 30.

In FIG. 31 there is shown an end view of the double wedge action coupling 338 shown in FIG. 30.

Figure 32:
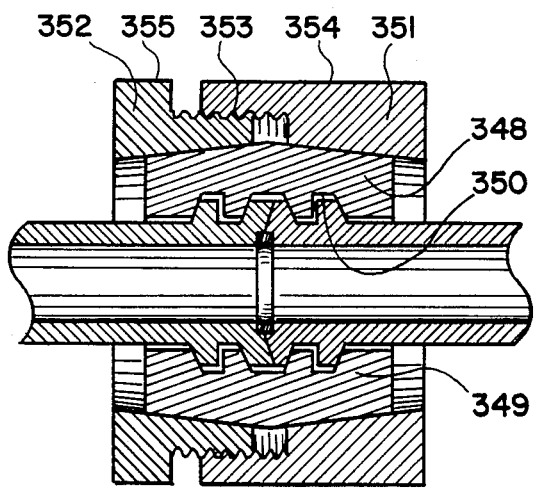
FIG. 32 illustrates a cross section of yet another double-wedge action coupling for the tubes and pipes under very high pressure.

In FIG. 32 there is shown a cross section of a further double wedge action coupling 347 comprising the split collar including two halves 348 and 349 with a plurality of the internal grooves 350 of the geometry and function similar to the corresponding elements described in conjunction with FIG. 26, and a pair of the closed collars 351 and 352 coupled to one another by the threaded means 353. The outer cylindrical surface of the split collar includes the double taper wherein the outside diameter is small at two extremities and large at the middle. The inner cylindrical surafces of the pair of the closed collars 351 and 352 include tapers matching to the each half of the taper included on the split collar. The outer surface of each of the pair of the closed collars 351 and 352 is provided with a wrench holds 354 and 355, respectively. The joining of two ends of the pipes or tubes including a plurality of the flanges matching to the plurality of the internal grooves 350 is accomplished by screwing the pair of the closed collars 351 and 352 to one another.

Figure 33:
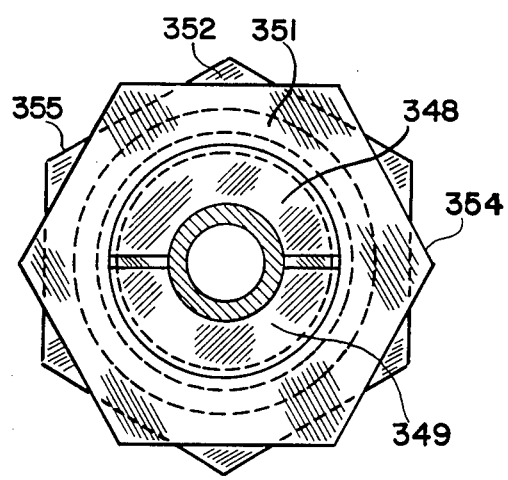
FIG. 33 illustrates an end view of the double-wedge action coupling shown in FIG. 32.

In FIG. 33 there is shown an end view of the double wedge action coupling 347 shown in FIG. 32.

Figure 34:
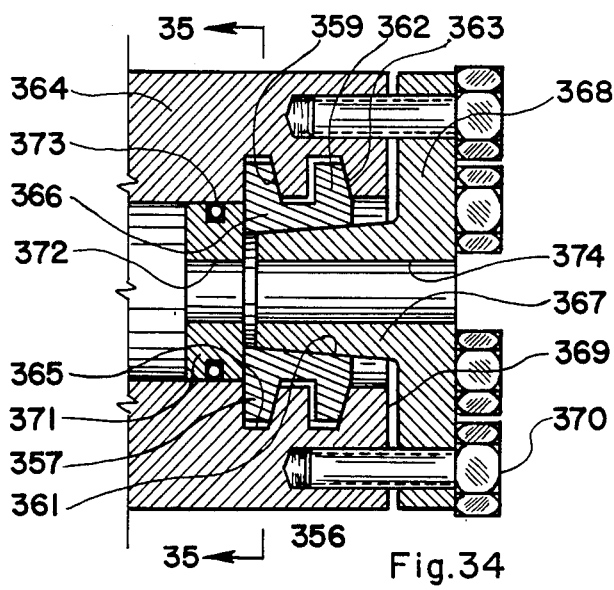
FIG. 34 illustrates a cross section of a double-wedge action reducer for the tubes and pipes under very high pressure, which cross section is taken along a plane including the central axis of the reducer.

In FIG. 34 there is shown a cross section of a double wedge action retainer 356 which cross section is taken along a plane including the central axis of the double wedge action retainer 356 which is ideal for plugging up the open end of the cylindrical cavity included in the ball plug valve. The double wedge action retainer 356 comprises a segmented retainer ring 357 including a plurality of the ring segments 358, 359 and 360, which has a centrally disposed tapered hole 361 and a plurality of the flanges 362 with one face 363 facing the nonpressurized end of the tubing 364 tapered in such a way that the ridge of the flange is narrower than its root, which plurality of the flanges 362 are disposed on the outer cylindrical surface of the segmented retainer ring 357. The plurality of the flanges 362 engage a plurality of matching grooves 365 with one side wall 366 sloped to match the tapered face 363 of the flanges 362, which plurality of matched grooves 365 are disposed on the inner cylindrical surface of the tubing 364. The centrally located tapered hole 361 of the segmented retainer ring 357 is engaged by a matching tapered cylinder 367 extending from a cover flange 368 which cover flange 368 is connected to the end face 369 of the tubing 364 by means of a plurality of the screws 370. The reducer 371 with a hole 372 and a resilient ring seal 373 is retained in the position by the segmented retainer ring 357 against the fluid pressure contained in the tubing 364. The hole 374 through the tapered cylinder 367 and the cover flange 368 is lined up with the centrally located hole 372 through the reducer 371. It is easy to visualize that the same double wedge action retainer 356 shown in FIG. 34 can be used to retain a blind plug substituting the reducer 371, in which case the hole 374 through the tapered cylinder 367 and the cover flange 368 can be eliminated. It should be mentioned that the cover flange 368 can be directly connected to the end of the tubing 364 by a threaded means without using the plurality of the screws 370. It should be understood that the retainer shown in FIG. 34 functions equally well without the tapers included in the faces of the flanges, in the side walls of the grooves, in the centrally located hole through the segmented retainer ring and in the cylinder extending from the cover flange.

Figure 35:
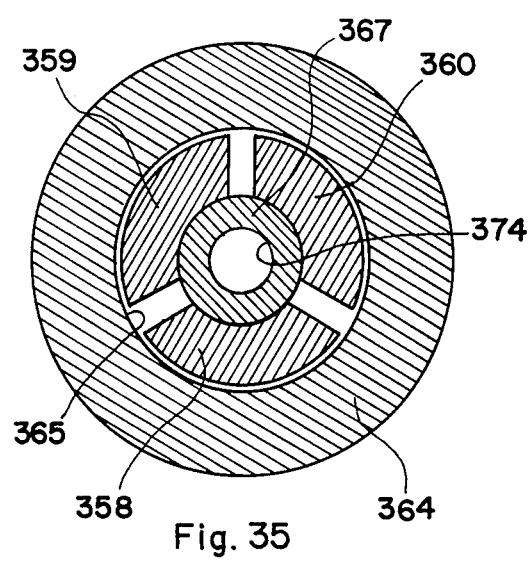
FIG. 35 illustrates a cross section of the double-wedge action reducer of FIG. 34, which cross section is taken along a plane 35—35 as shown in FIG. 34.

In FIG. 35 there is illustrated a cross section 35—35 of the double wedge action retainer 356 shown in FIG. 34.

While the principles of the present invention have now been made clear by the illustrative embodiments, there will be immediately obvious to those skilled in the art many modifications of the structure, arrangement, elements, proportion and material particularly adapted to the specific working environment and the operating conditions without departing from those principles.

We claim:

1. The ball plug valve comprising in combination:
  (a) a valve body including:
    (1) a cylindrical cavity with a closed substantially hemispherical end;
    (2) a first fluid passage hole extending from said cylindrical cavity to one extremity of said valve body through said valve body wherein the central axis of said first fluid passage hole substantially passes through the center of the spherical surface including said substantially hemispherical end of said cylindrical cavity and substantially intersects the central axis of said cylindrical cavity in an oblique angle;
    (3) a second fluid passage hole extending from said cylindrical cavity to the other extremity of said valve body through said valve body wherein the central axis of said second fluid passage hole substantially passes through the center of the spherical surface including said substantially hemispherical end of said cylindrical cavity and substantially intersects the central axis of said cylindrical cavity in an oblique angle;
    (4) a first connection means disposed at said one extremity of said valve body for connecting said valve body to a pipe line;
    (5) a second connection means disposed at said the other extremity of said valve body for connecting said valve body to a pipe line;
  (b) a ball plug of cylindrical geometry having a substantially hemispherical end and rotatably engaging said cylindrical cavity included in said valve body in a close tolerance, said ball plug including a through hole wherein the central axis of said through hole substantially passes through the center of the spherical surface including said substantially hemispherical end of said ball plug and substantially intersects the central axis of said ball plug in an oblique angle;
  (c) a closure having a hole plugging up the open end of said cylindrical cavity included in said valve body in a leak-proof fashion and thus retaining said ball plug within said cylindrical cavity;
  (d) a valve stem coaxially connected to said ball plug, said valve stem rotatably engaging and extending through said hole through said closure in a leak-proof fashion; and
  (e) means for rotating said valve stem for opening and closing of said ball plug valve.

2. The combination as set forth in claim 1 wherein a resilient annular seal is disposed in said valve body adjacent to said ball plug on a plane substantially perpendicular to a plane including the central axis of said cylindrical cavity included in said valve body and the central axis of said first and second fluid passage holes and substantially perpendicular to the central axis of said through hole in said ball plug when said ball plug is rotated to an angular position wherein said first and second fluid passage holes are connected to one another by said through hole in said ball plug.

3. The ball plug valve comprising in combination;
   (a) a valve body including;
      (1) a cylindrical cavity with a closed substantially hemispherical end;
      (2) a first fluid passage hole extending from said cylindrical cavity to one extremity of said valve body through said valve body wherein the central axis of said first fluid passage hole substantially passes through the center of the spherical surface including said substantially hemispherical end of said cylindrical cavity and substantially intersects the central axis of said cylindrical cavity in an oblique angle;
      (3) a second fluid passage hole extending from said cylindrical cavity to the other extremity of said valve body through said valve body wherein the central axis of said second fluid passage hole substantially passes through the center of the spherical surface including said substantially hemispherical end of said cylindrical cavity and substantially intersects the central axis of said cylindrical cavity in an oblique angle;
      (4) a first connection means disposed at said one extremity of said valve body for connecting said valve body to a pipe line;
      (5) a second connection means disposed at said the other extremity of said valve body for connecting said valve body to a pipe line;
   (b) a ball plug of cylindrical geometry having a substantially hemispherical end and rotatably engaging said cylindrical cavity included in said valve body in a close tolerance, said ball plug including a through hole wherein the central axis of said through hole substantially passes through the center of the spherical surface including said substantially hemispherical end of said ball plug and substantially intersects the central axis of said ball plug in an oblique angle;
   (c) a closure having a hole plugging up the open end of said cylindrical cavity included in said valve body in a leak-proof fashion and thus retaining said ball plug within said cylindrical cavity;
   (d) a valve stem coaxially connected to said ball plug, said valve stem rotatably engaging and extending through said hole through said closure in a leak-proof fashion;
   (e) means for rotating said valve stem for opening and closing of said ball plug valve;
   (f) a resilient annular seal disposed intermediate said ball plug and said cylindrical cavity included in said valve body on a plane substantially perpendicular to the central axis of said through hole in said ball plug when said ball plug is rotated to a position wherein said first and second fluid passage holes are connected to one another by said through hole in said ball plug.

4. The combination as set forth in claim 3 wherein a means for establishing and relieving the seating pressure between said resilient annular seal and said ball plug is included.

5. The combination as set forth in claim 4 wherein said means for establishing and relieving the seating pressure between said resilient annular seal and said ball plug includes means for moving said ball plug in a direction parallel to the central axis of said ball plug over a small distance.

6. The combination as set forth in claim 4 wherein said means for establishing and relieving the seating pressure between said resilient annular seal and said ball plug includes mechanical means for moving said resilient annular seal toward to and away from said ball plug over a small distance.

7. The combination as set forth in claim 4 wherein said means for establishing and relieving the seating pressure between said resilient annular seal and said ball plug includes hydraulic means for moving said resilient annular seal toward to and away from said ball plug over a small distance.

8. The combination as set forth in claim 1 wherein a resilient annular seal is disposed on said ball plug on a plane substantially parallel to the central axis of said through hole in said ball plug and substantially perpendicular to a plane including the central axis of said ball plug and the central axis of said through hole of said ball plug.

9. The combination as set forth in claim 1 wherein a first resilient annular seal is disposed around the cylindrical portion of said ball plug and a second resilient seal is disposed intermediate said ball plug and said cylindrical cavity included in said valve body on a plane substantially perpendicular to a plane including the central axis of said cylindrical cavity included in said valve body and the central axis of said first and second fluid passage holes and substantially perpendicular to the central axis of said through hole in said ball plug when said ball plug is rotated to an angular position wherein said ball plug blocks off the connection between said first and second fluid passage holes.

10. The three-way ball plug valve comprising:
    (a) a valve body including;
       (1) a cylindrical cavity with a closed substantially hemispherical end;
       (2) a first fluid passage hole extending from said cylindrical cavity to one extremity of said valve body through said valve body wherein the central axis of said first fluid passage hole substantially passes through the center of the spherical surface including said substantially hemispherical end of said cylindrical cavity and substantially intersects the central axis of said cylindrical cavity in an oblique angle;
       (3) a second fluid passage hole extending from said cylindrical cavity to the other extremity of said valve body through said valve body wherein the central axis of said second fluid passage hole substantially passes through the center of the spherical surface including said substantially hemispherical end of said cylindrical cavity and substantially intersects the central axis of said cylindrical cavity in an oblique angle;
       (4) a third fluid passage hole extending from said cylindrical cavity to a further extremity of said valve body through said valve body wherein the central axis of said third fluid passage hole substantially passes through the center of the spherical surface including said substantially hemispherical end of said cylindrical cavity and substantially intersects the central axis of said cylindrical cavity in an oblique angle;
  (5) a first connection means disposed at said one extremity of said valve body for connecting said valve body to a pipe line;
  (6) a second connection means disposed at said the other extremity of said valve body for connecting said valve body to a pipe line;
  (7) a third connection means disposed at said a further extremity of said valve body for connecting said valve body to a pipe line;
(b) a ball plug of cylindrical geometry having a substantially hemispherical end and rotatably engaging said cylindrical cavity included in said valve body in a close tolerance, said ball plug including a through hole and a branching hole branching off from said through hole wherein the central axis of said through hole and the central axis of said branching hole substantially passes through the center of the spherical surface including said substantially hemispherical end of said ball plug and substantially intersects the central axis of said ball plug in an oblique angle;
(c) a closure having a hole plugging up the open end of said cylindrical cavity included in said valve body in a leak-proof fashion and thus retaining said ball plug within said cylindrical cavity;
(d) a valve stem coaxially connected to said ball plug, said valve stem rotatably engaging and extending through said hole through said closure in a leak-proof fashion; and
(e) means for rotating said valve stem for opening and closing of said three-way ball plug valve.

11. The ball plug valve for throttling, said ball plug valve comprising;
(a) a valve body including;
  (1) a cylindrical cavity with a closed substantially hemispherical end;
  (2) a first fluid passage hole extending from said cylindrical cavity to one extremity of said valve body through said valve body wherein the central axis of said first fluid passage hole substantially passes through the center of the spherical surface including said substantially hemispherical end of said cylindrical cavity and substantially intersects the central axis of said cylindrical cavity in an oblique angle;
  (3) a second fluid passage hole extending from said cylindrical cavity to the other extremity of said valve body through said valve body wherein the central axis of said second fluid passage hole substantially passes through the center of the spherical surface including said substantially hemispherical end of said cylindrical cavity and substantially intersects the central axis of said cylindrical cavity in an oblique angle;
  (4) a first connection means disposed at said extremity of said valve body for connecting said valve body to a pipe line;
  (5) a second connection means disposed at said the other extremity of said valve body for connecting said valve body to a pipe line;
(b) a ball plug of cylindrical geometry having a substantially hemispherical end and rotatably engaging said cylindrical cavity included in said valve body in a close tolerance, said ball plug including a through hole wherein the central axis of said through hole substantially passes through the center of the spherical surface including said substantially hemispherical end of said ball plug and substantially intersects the central axis of said ball plug in an oblique angle;
(c) a closure having a hole plugging up the open end of said cylindrical cavity included in said valve body in a leak-proof fashion and thus retaining said ball plug within said cylindrical cavity;
(d) a valve stem coaxially connected to said ball plug, said valve stem rotatably engaging and extending through said hole through said closure in a leak-proof fashion;
(e) means for rotating said valve stem for opening and closing of said ball plug valve;
(f) another cavity included in said ball plug, said another cavity pierced by said through hole in said ball plug;
(g) a hole coaxially disposed through said valve stem extending from said another cavity included in said ball plug to the extremity of said valve stem;
(h) a blocking body occupying said another cavity included in said ball plug;
(i) another valve stem coaxially connected to said blocking body, said another valve stem rotatably engaging and extending through said hole coaxially disposed through said valve stem in a leak-proof fashion; and
(j) means for rotating said another valve stem for controlling said blocking body; whereby;the degree of the blockage of said through hole in said ball plug by said blocking body can be varied for throttling of said ball plug valve.

12. The combination as set forth in claim 11 wherein a resilient annular seal is disposed intermediate said ball plug and said cylindrical cavity included in said valve body on a plane substantially perpendicular to the central axis of said through hole in said ball plug when said ball plug is rotated to an angular position wherein said first and second fluid passage holes are connected one another by said through hole in said ball plug.

13. The combination as set forth in claim 12 wherein a means for establishing and relieving the seating pressure between said resilient annular seal and said ball plug is included.

* * * * *